United States Patent [19]
Hoskins et al.

[11] Patent Number: 5,545,091
[45] Date of Patent: Aug. 13, 1996

[54] UNIVERSAL JOINT COMPRISING A PAIR OF CROWN GEAR ELEMENTS CONFINED WITHIN A SLOTTED CASING

[76] Inventors: Hugh Hoskins, 7141 Butterfly Dr., Memphis, Tenn. 38133; Gary Hoskins, 716 Saddlebrook South, Bedford, Tex. 76021

[21] Appl. No.: 295,042

[22] Filed: Aug. 26, 1994

[51] Int. Cl.$^6$ ........................................... F16D 3/18
[52] U.S. Cl. ................................... 464/157; 464/106
[58] Field of Search ................................. 464/157, 106, 464/170; 403/310, 311, 344

[56] References Cited

U.S. PATENT DOCUMENTS

| | | |
|---|---|---|
| Re. 22,555 | 10/1944 | Brooks . |
| 636,476 | 11/1899 | Webster . |
| 1,241,118 | 9/1917 | Hoskins . |
| 2,316,243 | 4/1943 | Hubbard . |
| 4,789,377 | 12/1988 | Hoskins . |

*Primary Examiner*—Daniel P. Stodola
*Assistant Examiner*—Emmanuel M. Marcelo
*Attorney, Agent, or Firm*—Young & Thompson

[57] ABSTRACT

A universal joint comprises a driving gear and a driven gear each provided with a respective crown gear cluster, and a slotted casing confining the driving gear and driven gear in meshing engagement. The casing comprises a slot through which the driven gear projects and along which the driven gear may be moved angularly from a first position in which the driving gear and driven gear are in-line, and a second position in which the driving gear and driven gear are substantially at right angles to one another. The universal joint further comprises a compression spring surrounding a drive shaft of the driving gear within the casing, and acting between a first bearing surface of the casing and the base of the crown gear cluster of the driving gear. The casing further comprises second bearing surfaces contacting the base of the crown gear of the driven gear, such that movement of the driven gear from its first position to its second position produces a camming action whereby the driving gear is forced downwardly relative to the casing against the action of the compression spring, and whereby the compression spring is in a relatively more relaxed state in the first position of the driven gear, and a relatively more compressed state in the second position of the driven gear.

6 Claims, 2 Drawing Sheets

5,545,091

UNIVERSAL JOINT COMPRISING A PAIR OF CROWN GEAR ELEMENTS CONFINED WITHIN A SLOTTED CASING

BACKGROUND OF THE INVENTION

1. Field of the Invention

The present invention relates to universal joints, and more particularly to a rotary coupling capable of transmitting even very large driving forces from a driving shaft to a driven shaft, at any angle between the two shafts from 0° up to and including 90°.

2. Description of the Prior Art

Rotary couplings of the crown gear type are well known, in which each of a driving and driven shaft are provided with a crown of gear teeth. When the shafts are aligned, the crowns on the respective shafts intermesh axially; when the shafts are angularly offset, at least one of the gear teeth of one crown is always engaged between a pair of teeth on the other crown. In this manner, power may be transmitted from the driving shaft to the driven shaft from a position of alignment of the two shafts up to a maximum angular displacement of the two shafts. Couplings of this type are particularly prevalent in dental tools.

An example of a prior art rotary coupling as described above is found in U.S. Pat. No. 1,241,118, to Hoskins. This Hoskins patent, like much of the prior art, mounts the gears in a hinged casing which serves to maintain the teeth of each gear in correct position relative to one another. Other examples of hinged casings used to correctly position the gear clusters of axially intermeshing crown gear couplings are provided in U.S. Pat. Nos. 636,476; 2,316,243; and Reissue 22,555.

The closest known prior art to the present invention is U.S. Pat. No. 4,789,377, in the name of Nathan D. Hoskins, which solves a number of the problems associated with the prior art described above, by the provision of a slotted casing containing a pair of crown gear clusters having semi-spherical gear teeth and semi-spherical sockets between adjacent gear teeth. As the present invention represents an improvement on, as well as a departure from, the universal joint described in U.S. Pat. No. 4,789,377, the entirety of that patent is hereby expressly incorporated by reference.

It has been found by the present inventors that the universal joint of U.S. Pat. No. 4,789,377 is nevertheless attended with several disadvantages that restrict its commercial feasibility. In particular, it has been found that the semi-spherical shape of the gear teeth on the crown gear clusters is very difficult to machine, which causes the manufacture of such a device to be excessively complicated and expensive.

Moreover, the slotted casing of this prior art universal joint is provided with differentiated bearing surfaces 14, 15 for the driven gear, which bearing surfaces 14, 15 differ substantially in height along the longitudinal dimension of the casing. Still further, the device described in this patent requires the use of an undulate spring 23 captive on the shaft of the angularly movable driven gear, which is thus interposed between the base of the crown gear cluster and the differentiated bearing surfaces 14, 15. In manufacturing devices according to the teachings of U.S. Pat. No. 4,789,377, it has been found that the presence of spring 23, although necessary to urge the gear clusters of the drive and driven shafts into meshing engagement, nevertheless detracts from the smooth operation of the device, particularly when the driven gear 1 is moved through its 90° range of travel and the spring 23 is thereby caused to slide across the differentiated bearing surfaces 14, 15.

An additional disadvantage of the universal joint described in U.S. Pat. No. 4,789,377 is that the structure of the slotted casing has proven to be undesirably large and insufficiently sturdy for especially heavy duty applications.

SUMMARY AND OBJECTS OF THE INVENTION

It is accordingly a principal object of the present invention to provide a universal joint that overcomes the shortcomings of the prior art as described above, by virtue of a structure that allows smoother and more reliable operation of the joint over its 90° operating range.

It is another object of the invention to provide a universal joint in which the gear teeth are configured to mesh and transmit smoothly, but can nevertheless be more readily machined than semi-spherical gear teeth.

It is a further object of the invention to provide a universal joint in which the structure of the slotted casing is improved both as to compactness and strength.

The above and other objects of the present invention are achieved by a universal joint having a driving gear and a driven gear confined within a slotted casing that permits the driven gear to move angularly relative to the drive gear over a 90° range. According to the invention, the gear teeth of each crown gear cluster are of rounded trapezoidal shape. Preferably one of the crown gears comprises a bullet-shaped or ball-shaped insert, which serves to limit the extent of axial interpenetration of the teeth of the other crown gear cluster.

According to an important feature of the invention, a compression spring is provided on the shaft of the drive gear, and acts between its bearing seat in the casing and the base of its crown gear cluster. The bearing surfaces in the top of the slotted casing are specially configured, so that angular movement of the driven gear from its in-line position to the 90° position produces a camming action whereby the drive gear is displaced axially downwardly relative to the housing, against the action of the compression spring.

According to another important feature of the invention, the casing is formed of two interfitting pieces each of which extends substantially the entire length of the casing, and each of which define part of the bearing surfaces for both the drive shaft and the driven shaft.

BRIEF DESCRIPTION OF THE DRAWINGS

The above and other objects and advantages of the invention will be apparent from the following detailed description of preferred embodiments thereof, taken with reference to the accompanying drawings, in which.

DETAILED DESCRIPTION OF PREFERRED EMBODIMENTS

Figure 1:
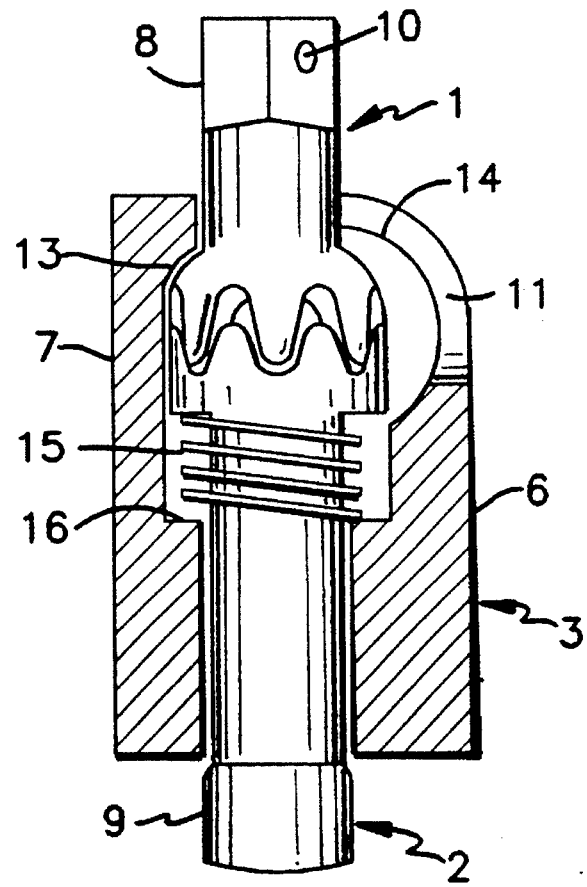
FIG. 1 is an axial section through the slotted casing according to the invention, showing the drive shaft and driven shaft in the in-line orientation.

Referring now to FIG. 1, the universal joint according to the present invention comprises a drive shaft 2 and an angularly movable driven shaft 1. Drive shaft 2 and driven shaft 1 are maintained in meshing engagement by a slotted casing 3, which is comprised of a pair of interfitted pieces 6, 7. The assembled casing 3 comprises an arcuate slot 11, which extends from the top of casing 3 to partway down one of its sides. This slot permits the driven shaft 1 to be moved angularly from the in-line position shown in FIG. 1, to the 90° position shown in FIG. 2, as well as to assume any intermediate angular position. It will be appreciated that the section plane in FIGS. 1 and 2 bisects slot 11, and that casing 3, as well as its component pieces 6 and 7, are symmetrical with respect to a plane bisecting slot 11.

As it is contemplated that a significant application of the universal joint according to the present invention will be as an adapter for socket wrenches and the like, the drive shaft 2 is provided at its lower end with a connector 9 having a square-shaped socket formed therein, and driven shaft 1 is provided with the corresponding male socket connector, namely a square-shaped projection 8 provided with a spring-urged ball 10.

Figure 2:
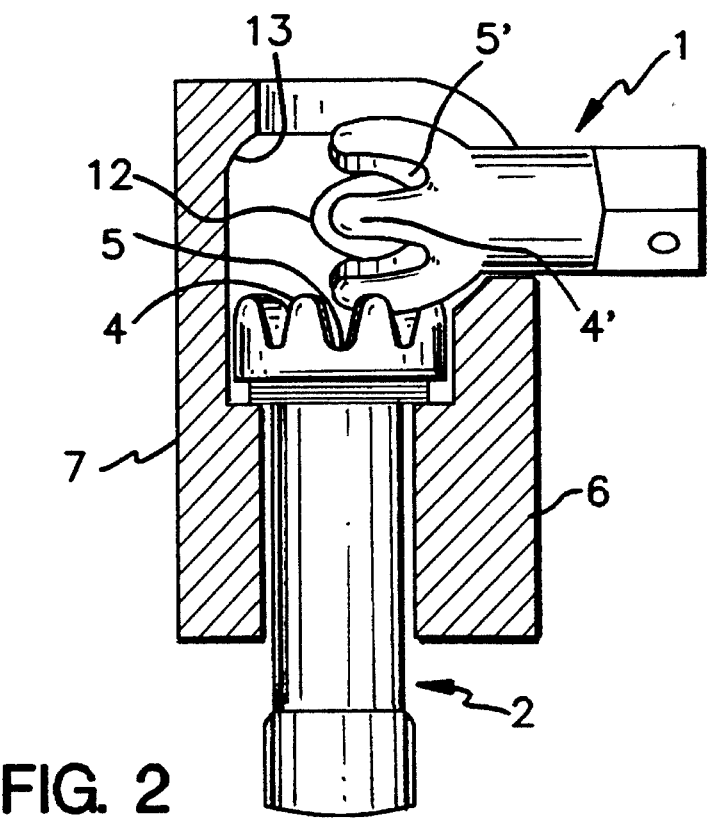
FIG. 2 is a view similar to FIG. 1, showing the drive shaft and driven shaft in their 90° orientation relative to one another.

As also shown in FIG. 1, the base of the crown gear cluster on the driven gear 1 is rounded so as to have a generally bell-shaped contour, which is complementary with bearing surface 13 that contacts driven gear 1 in the in-line position, and also generally complementary with bearing surface 14 that contacts driven gear 1 in the 90° position shown in FIG. 2. Thus, in contrast to the universal joint described in U.S. Pat. No. 4,789,377, the crown gear cluster of the driven gear according to the invention directly contacts the associated bearing surfaces in the upper part of the casing.

On the other hand, the base of the crown gear cluster on drive shaft 2 is in this embodiment a flat annular region that provides a contact area for compression spring 15, which extends between the base of the crown gear cluster on drive shaft 2 and a complementary-shaped seat 16 defined by the assembled pieces 6 and 7 of casing 3. In the in-line position of gears 1, 2 as shown in FIG. 1, compression spring 15 is in its relatively relaxed state, but is nevertheless still slightly in compression.

FIG. 2 shows the universal joint of the present invention after the angularly movable driven shaft 1 has been moved from the in-line position to the 90° position. As illustrated by FIGS. 1 and 2, an important feature of the present invention is that the bearing surface 14, formed on both sides of slot 11 and interrupted by that slot, performs the dual function of not only providing a bearing surface for driven gear 1 throughout its range of angular movement, but also producing a camming action on the driven gear 1, whereby, as the driven gear 1 is moved from its in-line position to its 90° position, the driven gear 1 forces the drive gear 2 downwardly against the action of spring 15. Thus, FIG. 2 shows spring 15 in its relatively more compressed state. By this structure, therefore, the height differential between bearing surfaces 13, 14 along the longitudinal dimension of the casing 3, may be entirely eliminated, and in any event is less pronounced than in the case of bearing surfaces 14, 15 of the universal joint described in U.S. Pat. No. 4,789,377.

In further contrast to the structure described in U.S. Pat. No. 4,789,377, the bearing surfaces 13, 14 according to the invention have a smooth transition therebetween, as shown in FIG. 2, and therefore are "non-differentiated". By contrast, in the device of U.S. Pat. No. 4,789,377, the differentiated bearing surfaces 14, 15 had a sharp discontinuity therebetween, which resulted in an undesirable "hop" when the driven shaft 1 was moved from the in-line to 90° position, which was further exacerbated by the presence of spring 23 on the driven gear.

Moreover, because the bell-shaped lower surface of driven gear 1 directly contacts bearing surfaces 13, 14, without the need for a spring such as that shown at 23 in U.S. Pat. No. 4,789,377, the operation of the universal joint according to the present invention is made considerably smoother.

Note that the spring 15 used in this embodiment of the invention does not impede the smooth transmission of power from drive shaft 2 to driven shaft 1, as did spring 23 in U.S. Pat. No. 4,789,377, because drive shaft 2 only rotates about its axis, and does not move over an angular range. Moreover, by virtue of this construction, the surfaces between which spring 15 acts, namely bearing seat 16 of casing 3 and the lower surface of the crown gear cluster on drive shaft 2, can both be made flat, thereby further improving the smooth rotation of either drive shaft 2 relative to spring 15, or, alternatively, drive shaft 2 conjointly with spring 15, relative to bearing seat 16.

It is contemplated that a pair of flat washers may be provided as separate bearing surfaces for the opposite ends of spring 15. That is, a first washer would be disposed surrounding the shaft of drive gear 2, between the top end of the spring and the bottom of the base of the crown gear cluster on drive shaft 2, whereas a second flat washer would be provided surrounding the shaft of drive shaft 2, between the bottom end of spring 15 and the bearing seat 16 of casing 3. It is believed that the provision of such flat washers may further improve the smooth operation of the universal joint in use.

FIG. 2 also shows the shape of the teeth 4 in each crown gear cluster, as seen from the side. In particular, and as discussed above, the teeth according to the invention are generally trapezoidal in shape. That is to say, a radial cross section taken through either of the crown gear clusters of the drive shaft 2 and driven shaft 1 would show a circular array of generally trapezoidal elements, in which all four vertical edges have been rounded to promote smooth intermeshing of the crown gear clusters, regardless of their angular orientation relative to one another. Additionally, the four horizontal edges defining the tops of the gear teeth 4 are likewise rounded, for the same purpose. Between each pair of adjacent gear teeth 4 is a generally trapezoidal-shaped recess 5, the edges of which have likewise been rounded, which recesses 5 are complementary in shape to the teeth 4 of the opposing crown gear cluster.

The teeth 4' and recesses 5' of the driven gear 1 are similarly shaped, but teeth 4' are taller than teeth 4 of drive gear 2, and, correspondingly, recesses 5' are deeper than recesses 5. This allows deeper intermeshing of the teeth as driven gear 1 travels from the in-line to the 90° position, consistent with the tighter more continuous arc in which gear 1 is guided by the bearing surfaces 13, 14.

As can also be seen in FIG. 2, the driven gear 1 comprises a bullet-shaped insert mounted centrally of the circular array of gear teeth 4 and recesses 5. The purpose of this insert is the same as is described in connection with bearing ball 6 in the universal joint of U.S. Pat. No. 4,789,377. In this case, however, it has been found that the semi-spherical depressions 13 of the prior art bearing ball 6 may be omitted, and, moreover, that the insert 12 according to the invention may be bullet-shaped, rather than ball-shaped. That is, the base of insert 12, not visible in FIG. 2, may have a cylindrical shape with a flat base, and be welded into a correspondingly shaped cylindrical socket in the center of the crown gear cluster of driven gear 1. Alternatively, insert 12 may be formed integrally with driven gear 1 in the first instance.

Figure 3:
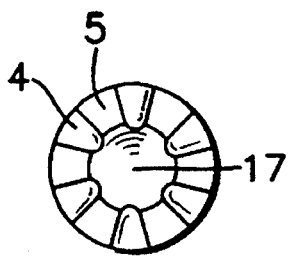
FIG. 3 is a top plan view of the drive shaft, showing the shapes of the gear teeth.

FIG. 3 shows the drive shaft 2 from above, and therefore depicts the circular array of generally trapezoidal-shaped gear teeth 4, alternating with complementary-shaped recesses 5. Additionally, FIG. 3 shows a central part-spherical or ellipsoidal recess 17, which receives the rounded projecting end of insert 12, when the drive shaft 2 and driven shaft 1 are in their in-line orientation.

Figure 4:
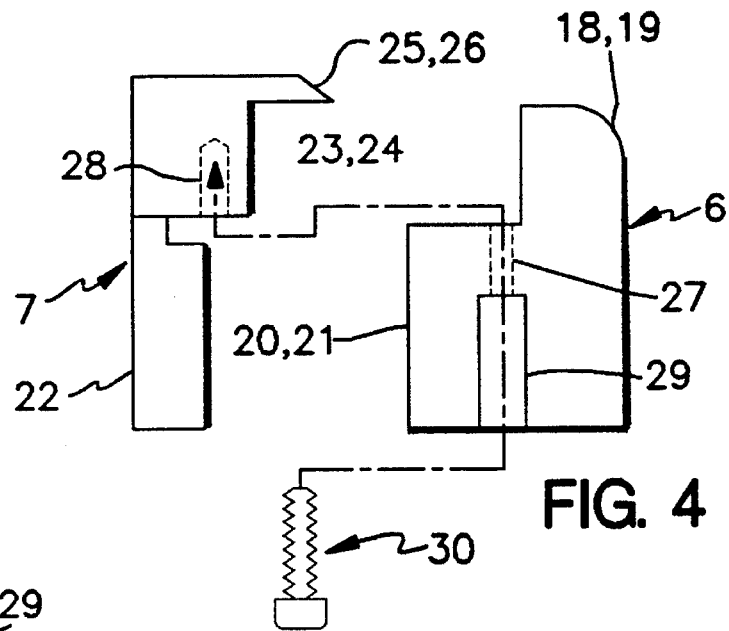
FIG. 4 is an exploded side view of one embodiment of the slotted casing according to the invention.
Figure 5:
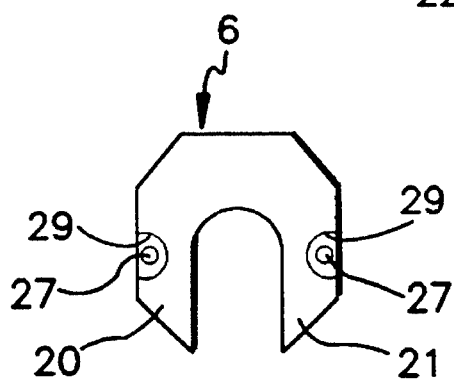
FIG. 5 is a bottom plan view of the right-side casing half of FIG. 4.
Figure 6:
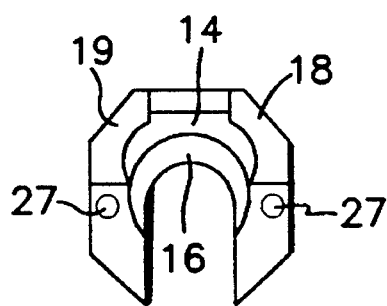
FIG. 6 is a top-plan view of the element of FIG. 5.
Figure 7:
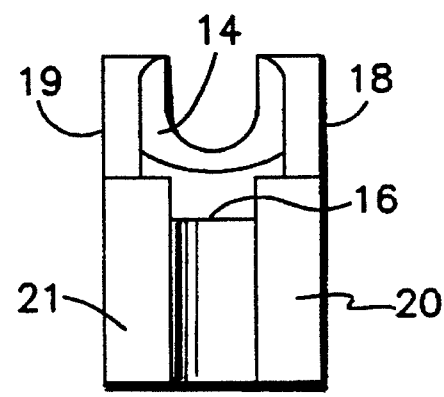
FIG. 7 is a left side view of the element of FIGS. 5 and 6.
Figure 8:
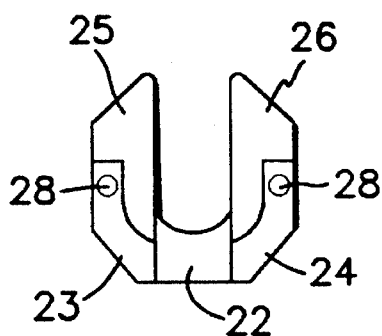
FIG. 8 is a bottom plan view of the left-side casing half of FIG. 4.
Figure 9:
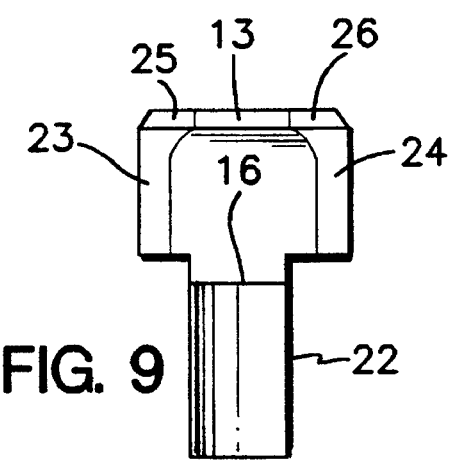
FIG. 9 is a right side view of the element of FIG. 8.

FIG. 4 is an exploded view showing the manner in which the pieces 6 and 7 of the slotted casing 3 fit together. In particular, the right-side half 6 of casing 3 comprises a pair of projecting pillars which together define the side portion of slot 11, as well as a pair of shank portions 20, 21 which together define a longitudinally extending recess that makes up part of the bore receiving the shaft of drive gear 2. The left-side piece 7 includes a lower tongue portion 22 that fits within the recess defined by shank portions 20, 21 and completes the bore in which the shaft of drive gear 2 rotates, as well as a pair of lateral portions 23, 24 that overlie shank portions 20, 21 respectively and abut against pillars 18 and 19, respectively. Lastly, the top portion of piece 7 comprises a pair of tongue elements 25, 26, which together define the top portion of slot 11, and which overlie the tops of pillars 18 and 19.

When the drive shaft 2, driven shaft 1 and spring 15 are assembled within casing pieces 6 and 7, the pieces 6 and 7 are then interfitted to close the slotted casing 3 and form the complete universal joint assembly. When the universal joint is in its assembled condition, a pair of preferably smooth bores 27 in piece 6 are aligned with a corresponding pair of threaded bores 28 in piece 7 whereafter a pair of screws 30 can be fitted into the part-cylindrical recesses 29 leading to bores 27, and the pieces 6 and 7 can be rigidly interconnected by screwing screws 30 into threaded bores 28.

The shapes of pieces 6 and 7 in this embodiment of the invention will be better appreciated upon examining the several views thereof shown in FIGS. 5–9, wherein like reference numerals are used to designate the same elements.

For example, it is apparent from a consideration of FIGS. 6–9, how the tongue portion 22 of the left-side piece 7 5 fits within the recess defined by shank portions 20, 21 of the right-side piece 6, thereby to close the lower part of the casing 3 and to define the bore in which the shaft of drive gear 2 is confined. Likewise, FIGS. 5 and 7 together show the shape of arcuate slot 11 that is formed when the casing 3 is assembled, from which figures it will be appreciated that the width of slot 11 is slightly greater than the diameter of the drive shaft of driven gear 1, but of course less than the width of the crown gear cluster of driven gear 1.

Although the invention has been described in detail above in connection with various preferred embodiments thereof, it will be appreciated by those skilled in the art that these embodiments have been provided solely for purposes of illustration, and are in no way to be considered as limiting the invention. Instead, various modifications and substitutions of equivalent techniques will be readily apparent to those skilled in the art upon reading this specification, and such modifications and substitutions are to be considered as falling within the true scope and spirit of the following claims.

What is claimed is:

1. In a universal joint comprising a driving gear and a driven gear each provided with a respective crown gear cluster, and a slotted casing confining said driving gear and said driven gear in meshing engagement, said casing comprising a slot through which said driven gear projects and along which said driven gear is angularly movable from a first position in which said driving gear and driven gear are in-line, and a second position in which said driving gear and driven gear are substantially at right angles to one another, the improvement in combination therewith comprising:

a compression spring surrounding a drive shaft of said driving gear within said casing, and acting between a first bearing surface of said casing and a base of the crown gear cluster of said driving gear, said casing further comprising second bearing surfaces contacting the base of the crown gear of said driven gear, said second bearing surfaces being shaped such that movement of said driven gear from said first position to said second position produces a camming action whereby said driving gear is forced downwardly relative to said casing against the action of said compression spring, and whereby said compression spring is in a relatively more relaxed state in said first position of said driven gear, and in a relatively more compressed state in said second position of said driven gear, and wherein said second bearing surfaces include an in-line bearing surface and a right-angle bearing surface, both of said in-line and right-angle bearing surfaces being interrupted by said slot, said in-line and right-angle bearing surfaces being interconnected by an intermediate bearing surface forming a smooth and continuous transition between said right-angle and in-line bearing surfaces, and producing said camming action, said compression spring having multiple coils and imparting to said drive gear a range of axial travel such that said driven gear is maintained against said second bearing surfaces throughout its range of angular movement.

2. The universal joint according to claim 1, wherein each of said crown gear clusters comprises a circular array of generally trapezoidal-shaped teeth having rounded edges.

3. The universal joint according to claim 1, wherein said slotted casing comprises two interfitted pieces, each of said two pieces extending substantially the entire longitudinal extent of said casing, said second bearing surfaces being formed conjointly by said first and second pieces.

4. The universal joint according to claim 3, wherein said first piece comprises a pair of projecting pillar elements defining a lateral portion of said slot, as well as a pair of lateral shank portions defining a portion of a bore receiving the shaft of said driving gear.

5. The universal joint according to claim 4, wherein said second piece of said casing comprises a tongue portion received between said lateral shank portions of said first piece, and completing the bore in which is received the shaft of said drive gear, said second piece further comprising a pair of spaced-apart tongue elements defining a top portion of said slot.

6. The universal joint according to claim 3, wherein each of said first and second pieces of said casing comprise a pair of bores adapted to receive a pair of screws, said pair of bores of said first piece being aligned with said pair of bores of said second piece, said first and second casing pieces being rigidly interconnected by screws passing through said pair of bores on both of said first and second casing pieces.

* * * * *